(No Model.)

J. W. STAFFORD.
ADJUSTABLE BEAM WHEEL.

No. 303,405. Patented Aug. 12, 1884.

Witnesses,
Geo. H. Strong

Inventor,
J. W. Stafford
By Dewey & Co.
Attorneys

UNITED STATES PATENT OFFICE.

JOHN WILLIAM STAFFORD, OF ACAMPO, CALIFORNIA.

ADJUSTABLE BEAM-WHEEL.

SPECIFICATION forming part of Letters Patent No. 303,405, dated August 12, 1884.

Application filed March 29, 1884. (No model.)

*To all whom it may concern:*

Be it known that I, JOHN W. STAFFORD, of Acampo, county of San Joaquin, and State of California, have invented an Improvement in Adjustable Beam-Wheels; and I hereby declare the following to be a full, clear, and exact description thereof.

My invention relates to a new and useful adjustable wheel for the beams of single plows, and for other agricultural implements in which such wheels are used; and my invention consists in a wheel peculiarly mounted in the lower end of a pivoted lever which is connected with an adjustable rack secured to the beam. By the movement of the lever on its own pivot, acting against the wheel as a fulcrum, the beam is raised or lowered, and by the side adjustment of the rack the wheel is thrown under or to one side of the beam, while by another adjustment the rack may be made to fit different beams. The advantage and object of these various adjustments will hereinafter fully appear.

Figure 1:
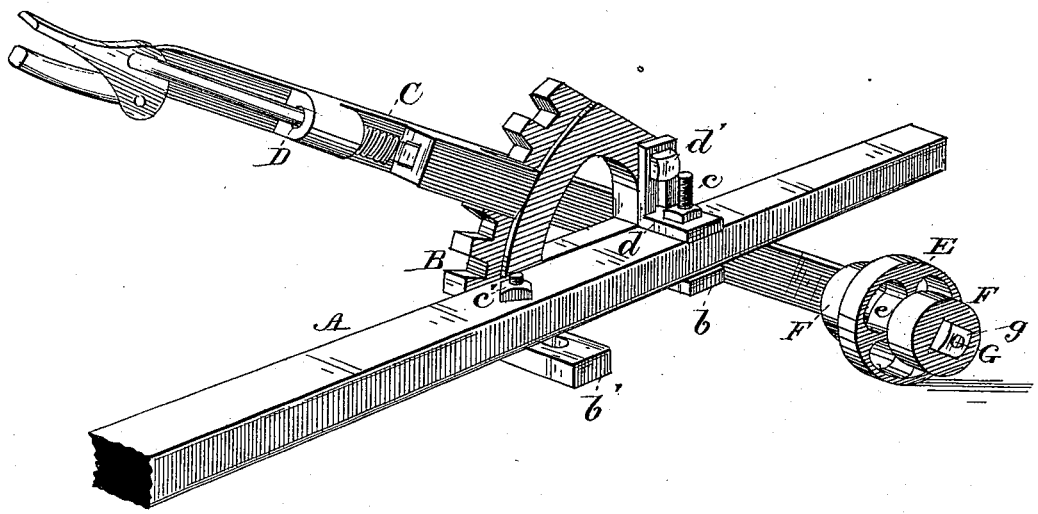
Figure 2:
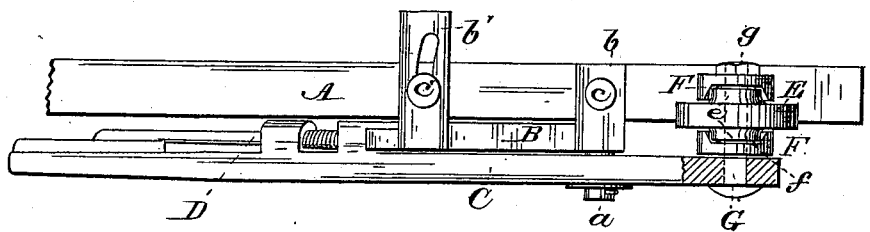
Figure 3:
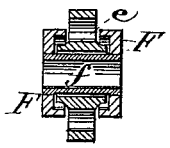

Referring to the accompanying drawings, Figure 1 is a perspective view of my adjustable beam-wheel. Fig. 2 is a plan showing the underneath part. Fig. 3 is a vertical section of the wheel and disks.

A represents the beam of a plow.

B is a rack-plate formed with arms $b\ b'$ extending at right angles from its lower edge. These arms pass under the beam, and the forward one, $b$, is pivoted thereto by a bolt, $c$. The rear one, $b'$, is provided with a slot, through which a bolt, $c'$, extends and passes through the beam. By these means the rack may have an adjustment to or from the beam at an angle turning on the bolt $c$ as a pivot, and set where adjusted by the bolt $c'$. Upon the forward portion of the rack on its inner face is an angled strip, $d$, one arm of which extends over the beam and receives the bolt $c$. The other or vertical arm is slotted, and receives a bolt, $d'$, which passes through the rack. By loosening this bolt the angled strip $d$ may be raised or lowered by reason of its slotted arm, to widen or narrow the space between its horizontal arm and the arm $b$ below, whereby the rack may be adapted for different thicknesses of beams.

C is a lever pivoted in any suitable manner to the lower forward corner or portion of the rack. The pivot-connection here shown is effected by means of a small pin or lug, $a$, projecting from the rack, and on this lug the lever is fitted and secured properly by a washer and cross-pin. The rear end of the lever extends beside the outer face of the rack, and back at an upward inclination to within convenient reach of the driver or plowman. It is provided with a spring-pawl mechanism, D, which engages with the rack. The forward end of the lever extends forwardly and inclines downwardly.

E is the wheel. This has a large hollow or perforated hub, $e$.

F are two flanged disks, having a connecting perforated hub, $f$, which extends within and through the perforated hub $e$, forming the journal of the wheel. A bolt, G, passes through the end of the lever and through the perforated hub $f$ of disks F and takes a nut, $g$, on its end. This bolt holds the journal and tightens it up. The disks F come close up to the hub of the wheel and form caps or covers to prevent dirt or sand from finding its way into the bearing. The object of the vertical adjustment of the wheel is to raise or depress the beam, and thereby regulate the depth of the furrow. This adjustment is readily accomplished by the operation of the lever C. The object of the side adjustment of the rack is to throw the lever to one side, and consequently to make the wheel run straight when the beam is moved sidewise.

Having thus described my invention, what I claim as new, and desire to secure by Letters Patent, is—

1. The combination of the beam, the rack-plate, and the means for giving said rack an adjustment to or from the beam at an angle, consisting of the arm $b$, slotted arm $b'$, pivot-bolt $c$, angled piece $d$, and set-bolt $c'$, substantially as herein described.

2. The beam A, in combination with the rack-plate B, the arm $b$, and slotted arm $b'$ of said rack, and the angled piece $d$, having a slotted arm, the bolts $c\ c'$, securing the rack to the beam, and the bolt $d'$, securing the angled piece to the rack, substantially as herein described.

3. The beam A, in combination with the rack-plate having an adjustment to or from the beam at an angle by means of the arm $b$, slotted arm $b'$, pivot-bolt $c$, and set-bolt $c'$, the lever C, pivoted to and engaging with the rack, and the wheel E, mounted on the lower end of the lever, substantially as herein described.

4. The combination of the beam, lever, and wheel, arranged with relation to each other as described, with a rack-plate to which the lever is pivoted, and with which it engages, said rack-plate having the arm $b$ below the beam, and the vertically-adjustable angled piece $d$ above the beam, said arms being secured by a bolt passing through the beam, substantially as herein described.

5. In combination with the beam, the wheel, and the lever, arranged with relation to each other as set forth, the rack-plate to which the lever is pivoted, and with which it engages, and a connection, substantially as set forth, between said rack and beam, by means of which the rack may be moved horizontally to an angle with the beam, substantially as herein described.

In witness whereof I have hereunto set my hand.

JOHN WILLIAM STAFFORD.

Witnesses:
C. STAFFORD,
R. P. LEGUIRE.